(12) United States Patent
Alday Lesaga et al.

(10) Patent No.: US 7,195,843 B2
(45) Date of Patent: Mar. 27, 2007

(54) ELECTROCHEMICAL ELEMENT OR CELL AND A CATHODE FOR SAME

(75) Inventors: Francisco Javier Alday Lesaga, Vitoria (ES); Fernando Perez Ortiz, Vitoria (ES); Igor Cantero Uribe-Echeberria, San Sebastian (ES); Hana Krysova, Prague (CZ); Dina Fattakhova, Prague (CZ); Petr Krtil, Nymburk (CZ)

(73) Assignee: Celaya, Emparanza y Galdos, S.A. (Cegasa), Alava (ES)

( * ) Notice: Subject to any disclaimer, the term of this patent is extended or adjusted under 35 U.S.C. 154(b) by 299 days.

(21) Appl. No.: 10/735,025

(22) Filed: Dec. 12, 2003

(65) Prior Publication Data
US 2004/0146783 A1    Jul. 29, 2004

(30) Foreign Application Priority Data
Dec. 13, 2002    (ES) .................. 200202867

(51) Int. Cl.
    *H01M 4/58*    (2006.01)
    *H01M 4/50*    (2006.01)
    *H01M 4/62*    (2006.01)

(52) U.S. Cl. ................ 429/231.5; 429/224; 429/232

(58) Field of Classification Search ........... 429/224, 429/231.5, 232
See application file for complete search history.

(56) References Cited

U.S. PATENT DOCUMENTS

| 5,342,712 | A | 8/1994 | Mieczkowska et al. ...... 429/224 |
| 5,532,085 | A | 7/1996 | Davis et al. ................. 429/224 |
| 5,569,564 | A | 10/1996 | Swierbut et al. ............ 424/224 |
| 5,599,644 | A | 2/1997 | Swierbut et al. ............ 429/224 |
| 5,895,734 | A | 4/1999 | Nardi et al. ................. 429/224 |
| 5,919,588 | A | 7/1999 | Jose et al. ................... 429/224 |
| 6,143,446 | A | 11/2000 | Davis et al. ................. 429/224 |
| 6,348,259 | B1 | 2/2002 | Hilarius et al. ............. 428/323 |

FOREIGN PATENT DOCUMENTS

WO    00/79622    12/2000

*Primary Examiner*—Patrick Joseph Ryan
*Assistant Examiner*—Thomas H. Parsons
(74) *Attorney, Agent, or Firm*—Nields & Lemack

(57) ABSTRACT

An electrochemical element or cell and a cathode for same which contains an anode, a separator, and a cathode composed of manganese dioxide; this cathode incorporates an inorganic crystalline additive of tungsten oxide, compounds of zirconium, titanium oxide with rutile structure, yttrium oxide, cerium oxide, zeolites and aluminosilicates, and at least one of these is present in a proportion or range between one ten thousandth (0.0001) and ten (10) percent by weight of the cathode mass.

24 Claims, 2 Drawing Sheets

ELECTROCHEMICAL ELEMENT OR CELL AND A CATHODE FOR SAME

FIELD OF THE INVENTION

The present invention refers to an electrochemical element or cell and a cathode for same, containing an anode, a separator, and a cathode composed of manganese dioxide.

PRIOR ART

This invention refers to a cathode of manganese dioxide with improved discharge capacity, consisting of electrochemically active manganese dioxide and a crystalline additive based on an oxygenated compound, and its use in primary cells.

Primary alkaline cells are usually made from a cathode of manganese dioxide, an anode of zinc, an alkaline electrolyte, and a separator permeable to the electrolyte.

The anode is usually made of a zinc powder with large surface area and a gelling agent serving as stabilizer. However, the anode can also be formed from a hot or cold sintered powder, in the presence or absence of plasticizers. The amalgamation technique previously used has recently been abandoned to improve the environmental compatibility of the cells produced.

The alkaline electrolyte used in the majority of cases is an aqueous solution of KOH. In some instances, other hydroxides have been used, such as NaOH or LiOH. The separator serves to electrically insulate the anode from the cathode.

The material commonly used as a cathode is gamma manganese dioxide soaked in electrolyte. To reduce the resistance of the cathode material, various types of carbon particles are added, such as graphite or carbon black or acetylene black. The mechanical properties of the cathode are usually improved by incorporating plasticizers.

U.S. Pat. No. 5,342,712 demonstrates an improvement in the discharge capacity as a result of adding titanium dioxide to the manganese dioxide. The discharge times with high or medium discharge current were increased by 10–15%. This increase in the discharge current was accompanied by an increase in the voltage of the cell during the discharge. Even so, the addition of the titanium produced an unfavorable behavior when using low discharge currents. The effect of the additive was attributed to the improved mobility of the protons in the cathode, which produced a decrease in the associated polarization. According to this patent, this effect is confined solely to the anatase structure and cannot be generalized to the case of adding rutile titanium dioxide.

U.S. Pat. Nos. 5,532,085; 5,569,564; 5,599,644; 5,895,734; 5,919,588 and 6,143,446 describe a similar effect for the addition of other titanium compounds. In all instances, the improvement in the discharge times is greater than 10%.

In many cases, the advantage of the mentioned additives is partially offset by their relatively high resistances, which produce an increase in the internal resistance of the cell. To improve their conductivity, WO Patent 0079622 proposes the doping of the additives, for example, $TiO_2$, with other oxides such as $Nb_2O_5$. However, this process increases the cost of the material.

Other additives proposed in place of the titanium compounds are $CaWO_4$, $ZnMn_2O_4$, $SnO$, $Al_2O_3$, $Nb_2O_5$ and $SnO_2$.

U.S. Pat. No. 6,348,259 describes a better behavior of the discharging of manganese dioxide by the addition of mica, silicate, $ZrO_2$, $Al_2O_3$, $SiO_2$ and ZnO, with or without coating; both the coated particles and those without coating improve the discharge time by more than 30%. One can observe a certain improvement in the fact that, unlike the previously mentioned patents, the addition of mica, both coated and uncoated, improves the discharge behavior also with low discharge currents.

EXPLANATION OF THE INVENTION AND ADVANTAGES

The object of the present invention is to provide an electrode of manganese dioxide, which, when used in galvanic [electrolytic] cells, electrochemical cells and primary cells, has prolonged discharge times and an improved output power.

The following detailed description will clarify any other aspect of this invention.

The objective of the invention is to develop a cathode of manganese dioxide which includes inorganic crystalline additives. These additives are oxides, silicates, oxo-nitrates of metals and certain tungstenates of metals. The most suitable oxides are titanium oxide—rutile structure; yttrium oxide and cerium dioxide; the most appropriate silicates are various aluminosilicates, both of laminar structure (clays of the kaolinite type or the montmorillonite type with an Si/Al ratio in the range of 2 to 5) and pentasile (zeolites of type ZSM-5 with an Si/Al ratio in the range of 20 to 600); among the oxonitrates, zirconium oxonitrate is especially effective; the most adequate tungstenates are those of barium, sodium, strontium and manganese. If these additives (or mixtures thereof) are mixed with manganese dioxide and an electrode is prepared, the use of said electrode in a primary cell provides a significant improvement in the discharge capacity and output power of same.

In this regard, one can use any commercial supplier of the mentioned additives. One should take into account that it is possible to use additives with any crystal size or distribution of same without significantly affecting the nature of the process.

The additives incorporated to improve the behavior of the manganese dioxide may include water of crystallization or contain foreign ions and therefore can be doped with them.

The electrodes made with manganese dioxide mixed with the aforesaid additives display a prolonged discharge time corresponding to a greater discharge capacity. The additives have a positive effect if they are incorporated in quantities in the range of 0.0001% to 10% in terms of the cathode composition. In particular, the modification of the electrodes of manganese dioxide with the previously listed additives produces an increase in the discharge time (and capacity) of up to 30% as compared to the same primary cells whose cathodes have not been modified.

The actual quantity of additive and its nature depends on the particular use of the primary cell using the electrode of manganese dioxide. While the addition of quantities as low as 0.05% produces a measurable effect on the discharge time of commercial cells, the addition of 10% may be advisable.

Accordingly, it may be advisable to vary the type and the quantity of additive depending on the anticipated use of the electrode.

DRAWINGS AND REFERENCES

The invention is described with greater detail in Examples 1 and 2 below. These examples are given in order to illustrate and facilitate the understanding of the present invention. However, they shall not restrict the actual invention.

The results of the discharge experiments are shown in the following figures.

Figure 1:
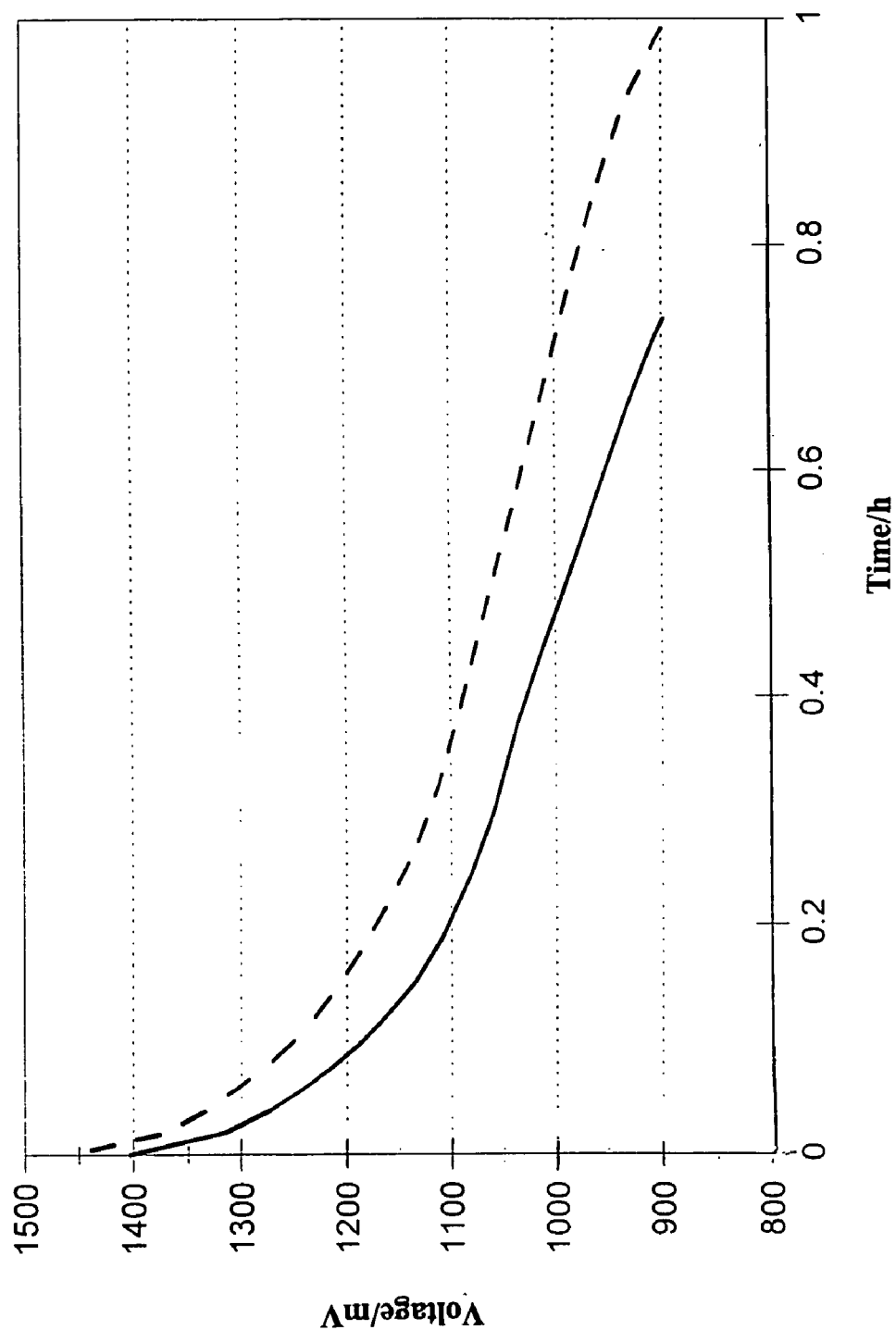
FIG. 1 shows the voltage of the cell plotted against the discharge time for the cells constructed and tested in accordance with Example 1. The solid line indicates the behavior of the standard cell and the broken line that of the experimental cell containing the additive according to the present invention.
Figure 2:
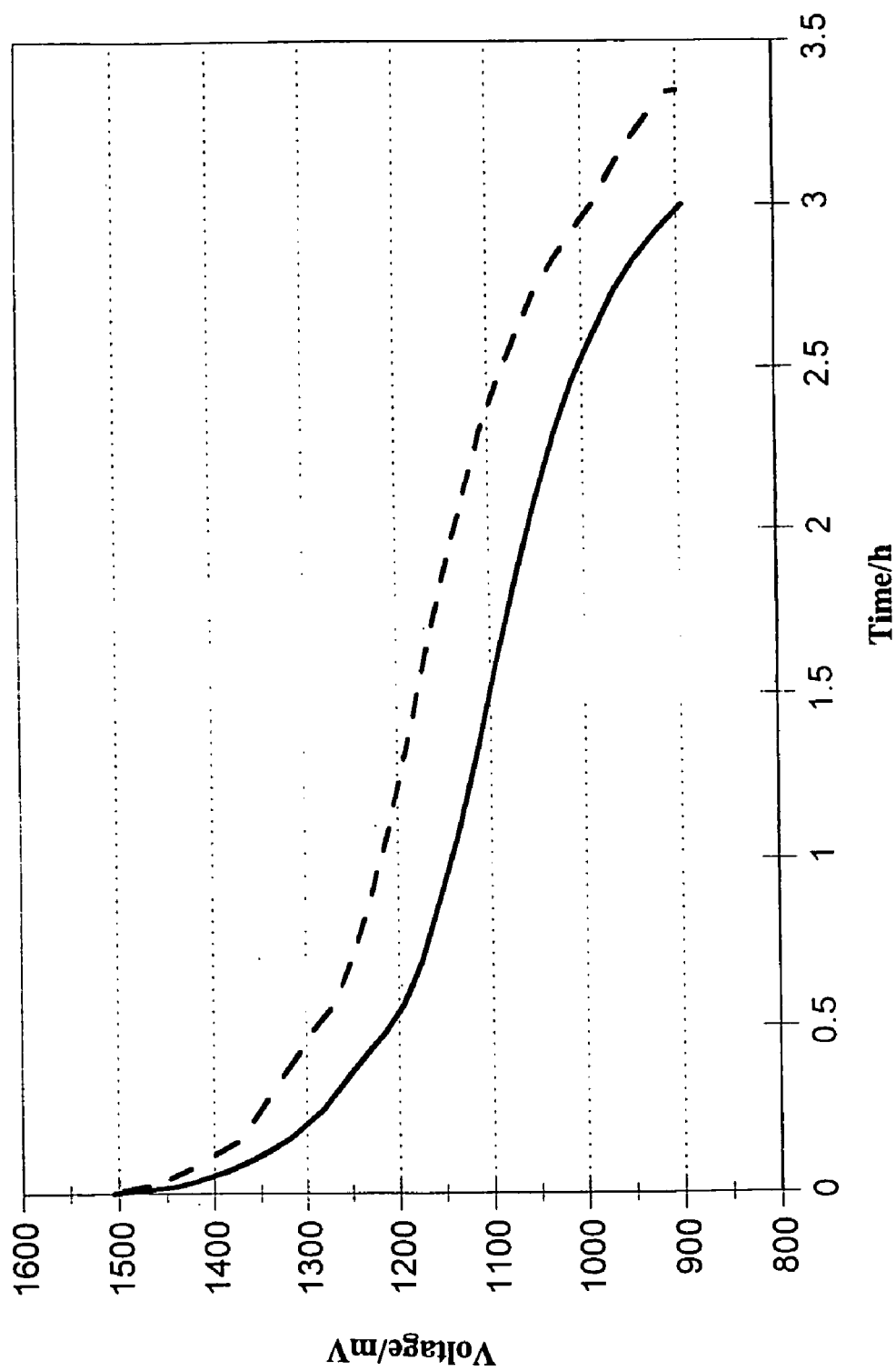
FIG. 2 shows the voltage of the cell plotted against the discharge time for the cells constructed and tested according to Example 2. The solid line indicates the behavior of the standard cell and the broken line that of the experimental cell containing the additive according to the present invention.

Finally, it is understood that changes in details, materials and arrangements of the parts which have been described and illustrated to explain the nature of this invention can be done by persons skilled in the art, without leaving the scope and objective of this invention.

PRESENTATION OF A PREFERRED EMBODIMENT

EXAMPLE 1

A conventional alkaline primary cell of zinc/manganese dioxide of size LR6 was prepared with conventional active anode and cathode materials, electrolyte, and separating membrane. The anode material formed a gelled mixture that included powdered zinc alloy and a gelling agent. The separator was a commercial nonwoven paper produced for use in alkaline cells with a thickness of 0.125 mm. The electrolyte was an aqueous solution containing approximately 40% by weight of KOH.

The active cathode material was prepared by mixing 89% by weight of electrolytic manganese dioxide, 6% by weight of graphite, and 5% by weight of a 9 N solution of KOH.

The experimental alkaline cell of zinc/manganese dioxide of size LR6 was prepared in identical fashion to the standard cell with the exception that it included 0.1% by weight of $ZrOCl_2$. The quantity of electrolytic manganese dioxide was reduced in accordance with the same quantity of additive incorporated so as to obtain the same total weight in the standard and experimental cells.

Both the standard cell and the experimental cell discharged with a constant current of 1 A. The experimental cell showed a notable improvement in the discharge behavior as regards the capacity and the output power. The experimental cell showed a 25–30% more favorable discharge behavior as compared to that for the standard cell.

EXAMPLE 2

A conventional alkaline primary cell of zinc/manganese dioxide of size LR6 was prepared with conventional active anode and cathode materials, electrolyte and separating membrane. The anode material formed a gelled mixture that included powdered zinc alloy and a gelling agent. The separator was a commercial nonwoven paper produced for use in alkaline cells with a thickness of 0.125 mm. The electrolyte was an aqueous solution containing approximately 40% by weight of KOH.

The active cathode material was prepared by mixing 89% by weight of electrolytic manganese dioxide, 6% by weight of graphite, and 5% by weight of a 9 N solution of KOH.

The experimental alkaline cell of zinc/manganese of dioxide of size LR6 was prepared in identical fashion to the standard cell with the exception that it included 0.1% by weight of $ZrOCl_2$. The quantity of electrolytic manganese dioxide was reduced in accordance with the same quantity of additive incorporated so as to obtain the same total weight in the standard and experimental cells.

Both the standard cell and the experimental cell discharged with a constant current across a resistance of 2.2 Ohms. The improvement in the discharge capacity obtained is around 10%.

The invention claimed is:

1. An electrochemical element or cell, characterized in that it contains an anode, a separator, and a cathode composed of manganese dioxide, in that this cathode incorporates at least one additive selected from the group consisting of compounds of zirconium, titanium oxide with rutile structure, yttrium oxide, cerium oxide, zeolites, aluminosilicates and tungsten oxides selected from the group consisting of barium tungstenate ($BaWO_4$), sodium tungstenate ($Na_2WO_4$), strontium tungstenate ($SrWO_4$) and manganese (II) tungstenate ($MnWO_4$), in a proportion or range between one ten thousandth (0.0001) and ten (10) percent by weight of the cathode mass.

2. The electrochemical element or cell according to the first claim, wherein said at least one additive is a zirconium compound selected from the group consisting of zirconium oxynitrate ($ZrO(NO_3)_2$) and zirconium oxychloride ($ZrOCl_2$).

3. The electrochemical element or cell according to the first claim, wherein said at least one additive is titanium dioxide ($TiO_2$) with rutile structure.

4. The electrochemical element or cell according to the first claim, wherein said at least one additive is yttrium oxide ($Y_2O_3$) or cerium dioxide ($CeO_2$).

5. The electrochemical element or cell according to the first claim, wherein said at least one additive is zeolites, aluminosilicate clays, or mixtures of both.

6. The electrochemical element or cell according to the first claim, wherein said at least one additive is a zeolite that has a ZSM-5 pentasile structure with an Si/Al ratio in the range of 20 to 600.

7. The electrochemical element or cell according to the first claim, wherein said at least one additive is an aminosilicate, said aminosilicate comprising an aminosilicate clay selected from the group consisting of kaolinite and montmorillonite with an Si/Al ratio in the range of 2 to 5.

8. The electrochemical element or cell according to the first claim, further characterized in that the total proportion of inorganic crystalline additive in the cathode is made up of one or more of an inorganic crystalline additive selected from the group consisting of barium tungstenate ($BaWO_4$), sodium tungstenate ($Na_2WO_4$), strontium tungstenate ($SrWO_4$), manganese (II) tungstenate ($MnWO_4$), zirconium oxynitrate ($ZrO(NO_3)_2$), zirconium oxychloride ($ZrOCl_2$), titanium dioxide ($TiO_2$) with rutile structure, yttrium oxide ($Y_2O_3$), cerium dioxide ($CeO_2$), zeolites, aluminosilicate clays, mixtures of both, a zeolite that has a ZSM-5 pentasile structure with an Si/Al ratio in the range of 20 to 600, kaolinite and montmorillonite with an Si/Al ratio in the range of 2 to 5.

9. The electrochemical element or cell according to the first claim, further characterized in that said additive contains water of crystallization.

10. The electrochemical element or cell according to the first claim, further characterized in that said additives contain foreign ions and are doped with them.

11. The electrochemical element or cell according to the first claim, further characterized in that the element or cell is alkaline.

12. The electrochemical element or cell according to the first claim, further characterized in that the anode includes zinc particles.

13. The electrochemical element or cell according to the first claim, further characterized in that it also contains a solution of electrolyte.

14. A cathode for an electrochemical element or cell, characterized in that it is a cathode composed of manganese dioxide and it incorporates at least one additive selected from the group consisting of compounds of zirconium, titanium oxide with rutile structure, yttrium oxide, cerium oxide, zeolites, aluminosilicates and tungsten oxides selected from the group consisting of barium tungstenate ($BaWO_4$), sodium tungstenate ($Na_2WO_4$), strontium tungstenate ($SrWO_4$) and manganese (II) tungstenate ($MnWO_4$), in a proportion or range between one ten thousandth (0.0001) and ten (10) percent by weight of the cathode mass.

15. The cathode for an electrochemical element or cell in accordance with fourteenth claim, wherein said at least one additive is a zirconium compound selected from the group consisting of zirconium compounds, specifically zirconium oxynitrate ($ZrO(NO_3)_2$) and zirconium oxychloride ($ZrOCl_2$).

16. The cathode for an electrochemical element or cell in accordance with the fourteenth claim, wherein said at least one additive is titanium dioxide ($TiO_2$) with rutile structure.

17. The cathode for an electrochemical element or cell in accordance with the fourteenth claim, wherein said at least one additive is yttrium oxide ($Y_2O_3$) or cerium dioxide ($CeO_2$).

18. The cathode for an electrochemical element or cell in accordance with the fourteenth claim, wherein said at least one additive is zeolites, aluminosilicate clays, or mixtures of both.

19. The cathode for an electrochemical element or cell in accordance with the fourteenth claim, wherein said at least one additive is a zeolite that has a ZSM-5 pentasile structure with an Si/Al ratio in the range of 20 to 600.

20. The cathode for an electrochemical element or cell in accordance with the fourteenth claim, wherein said at least one additive is an aminosilicate, said aminosilicate comprising an aminosilicate clay selected from the group consisting of kaolinite and montmorillonite with an Si/Al ratio in the range of 2 to 5.

21. The cathode for an electrochemical element or cell in accordance with fourteenth claim, further characterized in that the total proportion of inorganic crystalline additive in the cathode is made up of one or more of an inorganic crystalline additive selected from the group consisting of barium tungstenate ($BaWO_4$), sodium tungstenate ($Na_2WO_4$), strontium tungstenate ($SrWO_4$) and manganese (II) tungstenate ($MnWO_4$), zirconium oxynitrate ($ZrO(NO_3)_2$), zirconium oxychloride ($ZrOCl_2$), titanium dioxide ($TiO_2$) with rutile structure, yttrium oxide ($Y_2O_3$), cerium dioxide ($CeO_2$), zeolites, aluminosilicate clays, mixtures of both, a zeolite that has a ZSM-5 pentasile structure with an Si/Al ratio in the range of 20 to 600, kaolinite and montmorillonite with an Si/Al ratio in the range of 2 to 5.

22. The cathode for an electrochemical element or cell in accordance with the fourteenth claim, further characterized in that said additive contains water of crystallization.

23. The cathode for an electrochemical element or cell in accordance with the fourteenth claim, further characterized in that it is a cathode where the additives included in it contain foreign ions and are doped with them.

24. A cathode for an electrochemical element or cell, characterized in that it is a galvanic element which includes a cathode of manganese dioxide according to the fourteenth claim.

* * * * *